(12) United States Patent
Carrozza et al.

(10) Patent No.: US 6,947,500 B1
(45) Date of Patent: Sep. 20, 2005

(54) BUFFERING AND SEQUENCING OF SOFT DECISIONS OF MULTIPLE CHANNELS INTO A SINGLE SHARED BIORTHOGONAL DECODER

(75) Inventors: Dominic P. Carrozza, Redondo Beach, CA (US); Vincent C. Moretti, Torrance, CA (US); David A. Wright, Solana Beach, CA (US); Gregory S. Caso, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/239,871

(22) Filed: Jan. 29, 1999

(51) Int. Cl.[7] ............................................. H04L 27/06

(52) U.S. Cl. ..................... 375/340; 370/347

(58) Field of Search ................ 375/224, 316, 375/286, 259, 262, 340, 260; 370/376, 447, 370/431, 432, 436, 437, 441, 458, 464, 310, 370/315, 316, 319, 321, 326, 336, 337, 345, 370/347, 328, 329, 442; 714/786, 794, 795, 714/746, 699

(56) References Cited

U.S. PATENT DOCUMENTS

| | | | | |
|---|---|---|---|---|
| 4,704,715 A | * | 11/1987 | Shibagaki et al. | 370/307 |
| 5,448,592 A | * | 9/1995 | Williams et al. | 375/261 |
| 5,465,181 A | * | 11/1995 | Yoshinaka | 386/124 |
| 5,645,181 A | * | 7/1997 | Ichiba et al. | 212/281 |
| 5,852,428 A | * | 12/1998 | Ishikawa et al. | 345/100 |
| 6,041,050 A | * | 3/2000 | Sanders | 370/352 |
| 6,279,132 B1 | * | 8/2001 | Linsky et al. | 714/752 |
| 6,515,987 B1 | * | 2/2003 | Carrozza et al. | 370/366 |

* cited by examiner

Primary Examiner—Tesfaldet Bocure
Assistant Examiner—Pankaj Kumar
(74) Attorney, Agent, or Firm—Tarolli, Sundheim, Covell & Tummino L.L.P.

(57) ABSTRACT

The invention is a receiver and a method of receiving data having a preferred application in a satellite receiver in accordance with the invention includes a memory (114) including an addressable storage array which stores a sequence of data samples contained in a time division multiplexed signal from a plurality channels (X, Y and Z) and outputs the stored data samples in a sequence of data groups with each data group containing a plurality of samples from one of the plurality of channels; and a decoder (116), responsive to the data groups, which decodes the data samples within the data groups and outputs decoded data samples.

28 Claims, 4 Drawing Sheets

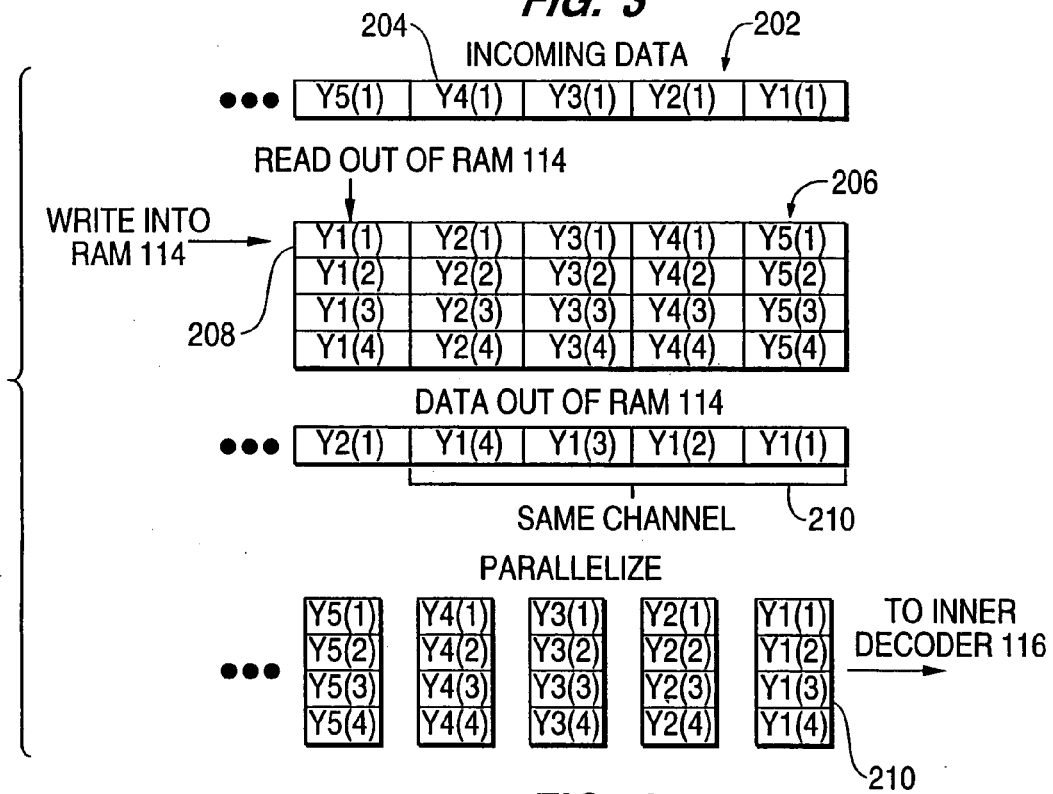
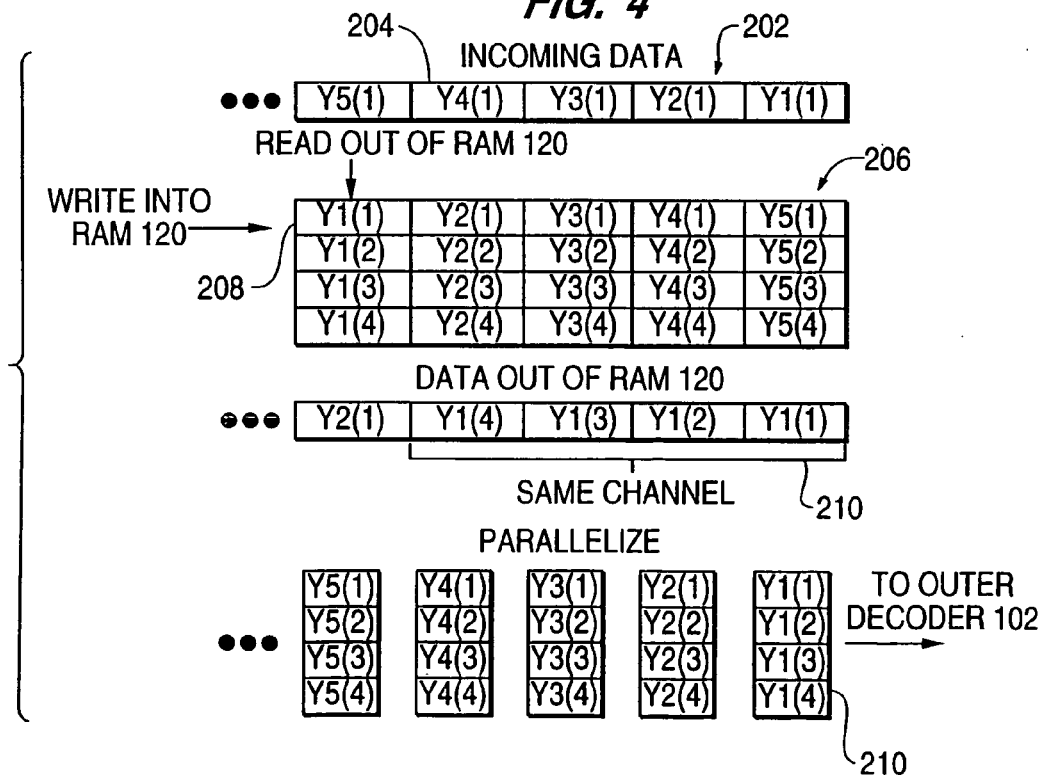

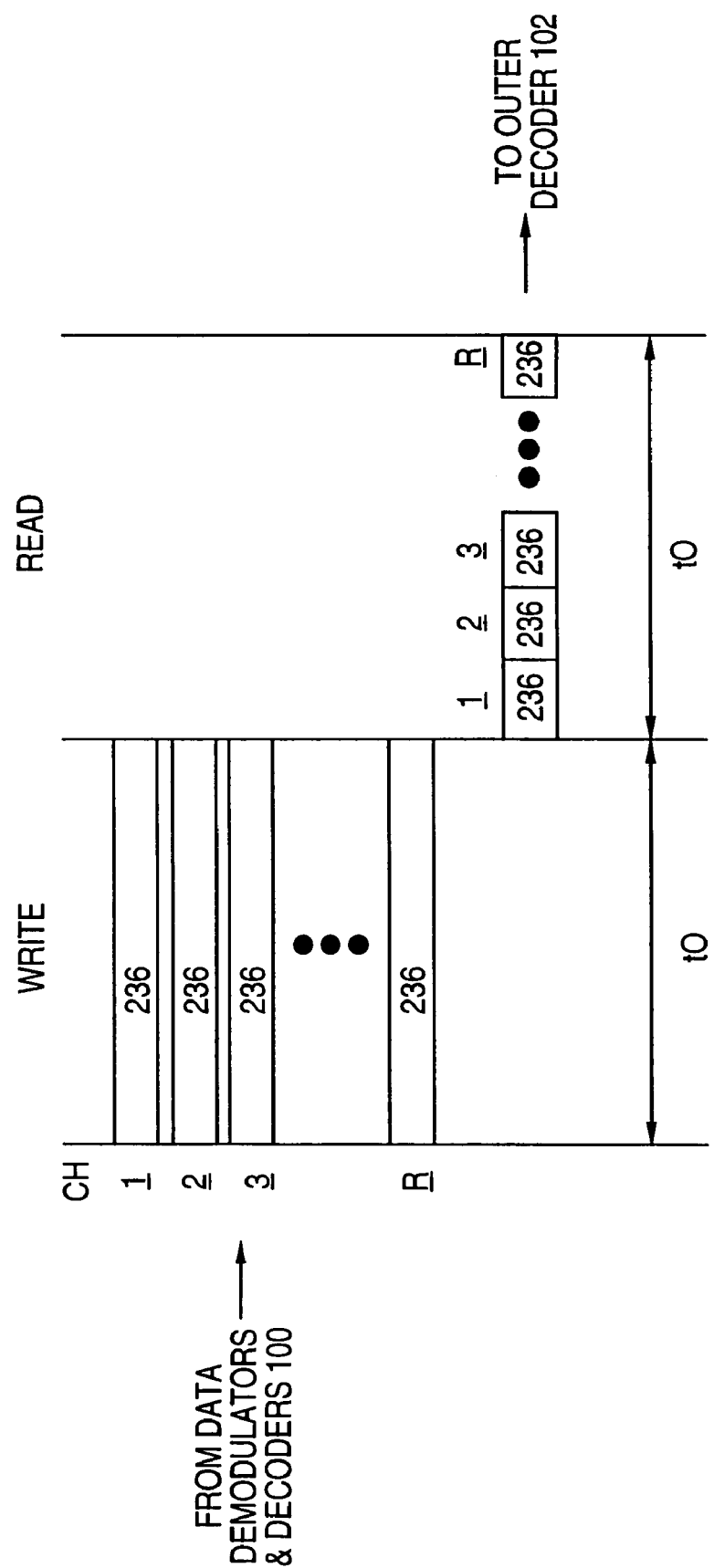

BUFFERING AND SEQUENCING OF SOFT DECISIONS OF MULTIPLE CHANNELS INTO A SINGLE SHARED BIORTHOGONAL DECODER

CROSS REFERENCE TO RELATED APPLICATIONS

Reference is made to related applications entitled "Serial to Parallel Conversion of Data to Facilitate Sharing a Single Buffer Among Multiple Channels," filed on even date herewith as U.S. Ser. No. 09/239,872; and "Buffering and Sequencing of Data From Multiple Channels Through a Shared Decoder," filed on even date herewith as U.S. Ser. No. 09/240,171, which applications are incorporated herein by reference in their entirety.

BACKGROUND OF THE INVENTION

1. Field of the Invention

The present invention relates to data receivers and methods of data reception and more particularly to data receivers in satellites and methods of receiving data with satellites which have reduced hardware for demodulating and decoding of data.

2. Description of Prior Art

Channelizers are well known in satellite data reception and function to divide a wide band received signal into a plurality of narrower band signals each of equal bandwidth. The data transmitted on a satellite uplink is typically frequency division multiplexed (FDM) and is divided into sub-bands by channelizers. Depending on the application, the sub-bands are again divided into narrower channels by additional channelizers.

Transmission access is further divided by time division multiplexing (TDM) into slots occupied by a transmission burst. These bursts utilize phase shift keying (usually either BPSK or QPSK) as the modulation method. Typically the bursts have a header that facilitates forming an initial estimate of the carrier phase and a body which carries information typically decoded by means of an error correction code.

Certain functions must be performed to receive data by a satellite which are, separation of the various uplink channels by frequency; the recovery of estimates of the modulated data from the burst body and the passing of the estimates to error correction processing, and the performing of decoding. In some applications, the data content of the burst is encoded in the form of ATM cells which are well known. When encoding utilizes ATM cells, it is necessary to recover the cells from the decoded data and to perform integrity checks upon them.

A satellite data reception system typically has three major sub systems. First, the aforementioned channelizer partitions the frequency spectrum of a beam into sub-bands. A sub-band demodulator and decoder performs demodulation and inner decoding on the signal in each sub-band outputted by the channelizer. A block and cell level processor (block decoder) typically processes the output of each inner decoder to perform outer decoding and cell level functions.

Signals within a sub-band may be arranged into one of three configurations. The sub-band demodulator and inner decoder must have functional capability to process each configuration, which are Type Z where the sub-band signal is configured as twenty-five narrow bandwidth, low data rate channels sharing the bandwidth by FDM; Type Y which is configured for five medium bandwidth channels, again shared by FDM, and Type X which is configured for a single wide bandwidth, high data rate channel occupying the full bandwidth.

In each of the sub-band FDM modes discussed above, transmission may occur in one of two error correction modes which are, heavy or light. In both the heavy and light cases, an outer code is used for data encoding which is typically a Reed-Solomon code over GF (256) of size (236, 212). In the heavy case, an inner code is also used. This inner code is typically a short rate one-half block code as, for example, the (8,4) biorthogonal code.

Jointly, there are six possible modes of data transmission, which are, XH, XL, YH, YL, ZH, and ZL. In each of these modes, the uplink transmission is organized time wise into frames typically of ninety-three milliseconds where each frame has two portions n which are a synch burst portion and a traffic burst portion occupying three and ninety milliseconds respectively. The demodulator inner decoder and data decoder is not required to process the synch burst field. The traffic burst field consists of a number of slots within which individual traffic bursts may be placed by an uplinking earth terminal. Typically, the number of slots in ZH mode is twenty four and in ZL mode is forty eight. In YH and YL modes, there are typically five times as many slots per frame. In XH and XL modes, there are typically twenty five times as many slots per frame. The cumulative encoded data rate is the same in heavy and in light modes in each of the modes X, Y and Z and is typically 0.5, 2.5 and 12.5 megasymbols per second respectively. The demodulator and decoder is required to examine the signal present in each burst slot, demodulate it and decode it regardless of whether it contains a valid traffic burst which is assigned to the uplinking terminal. The demodulator and decoder is required to function reliably with a phase of the uplink signal that is unknown. However, the demodulator and decoder may rely on the signal amplitude being well controlled as a result of uplink power control methods and may rely upon the incoming frequency of both a symbol carrier and the symbol timing being closely aligned to the demodulator and decoder timing. Unlike other burst demodulators, the demodulator and decoder in a satellite relies on the time alignment of the bursts that it is required to process being very precise so that the demodulator and decoder does not need to provide burst continuous delineation for symbol time recovery functions.

Since the ATM protocol requires the cells to be delivered in the same order that they are presented and since usage may involve demultiplexing where more than one channel is used to transport a cell stream, the demodulator and decoder must be sure that all bursts are processed in a predictable order when channelization is used (modes Y and Z) and that burst time order is preserved when heavy and light coding modes are mixed across channels. When the X mode is used, only a single channel is present and all bursts are either in heavy or light mode.

Each of the R decoders and demodulators 10 of the prior art of FIG. 1 receives an input from an X channelizer which provides a sub-band of data which may be divided into five equally spaced Y mode channels or twenty five Z mode channels by a Y and Z channelizer 12. The Y and Z channelizer 12 outputs five channels to a Y time demultiplexer 14 and twenty five channels to a Z time demultiplexer 16.

The direct input from the X channelizer, the five output channels from the Y time demultiplexer and twenty five channels from the Z time demultiplexer are applied to a mode select multiplexer 18 which has a total of twenty five output channels which are identically processed. Only the processing of the first output channel is described herein but it should be understood that the remaining twenty four channels are processed in the same manner with duplicated hardware and processing.

An output channel from the mode select multiplexer 18 is applied to a phase tracking function 20 and a preamble processing function 22 which function together as a phase estimation unit which correlates I and Q samples {p(n)} and {q(n)} against {t(n)} wherein {t(n)} is typically a M length sequence of + and −1's to produce variables I and Q as follows for light coding:

$$I=SUM[n=1 \text{ to } M{:}p(n)^*t(n)] Q=SUM[n=1 \text{ to } M{:}q(n)^*t(n)]$$

The phase tracking for heavy burst repeats this operation and sums the two results. The phase tracking function then estimates the initial phase of the burst $\theta_0$ by taking the arctangent of the ratio Q/I:

$$\theta_0 = ATN[Q/I].$$

This correlation action is typically performed in a standard accumulator configured to add or subtract as required by the sign of t(n) and the phase estimate is typically produced using a ROM. The estimate $\theta_0$ of the starting phase is supplied to the phase tracking function 20. The phase estimation provided by the combination of the phase tracking and aforementioned preamble processing functions 20 and 22 provides the estimate θ of the received signal phase in order to provide best bit error rate (BER) performance.

The phase lock loop provided by the phase tracking and preamble processing functions 20 and 22 operates in one of two modes relative to a decision direction depending upon whether the decoder and demodulator 10 is operating in the ZL or ZH modes. For light code bursts, the phase lock loop processes the {p(n)}, {q(n)} sample pairs for each symbol independently and forms an error estimate for the phase lock loop filter. In a typical case in the light mode, the phase lock loop is a first order phase lock loop which simply accumulates $k^*\epsilon_n$ to yield the phase estimate θ wherein $\epsilon_n$ is the phase error estimate for each sample pair. Since synchronization for advanced satellites maintains the uplink frequency within a very tight tolerance which is typically no worse than ±500 Hz or equivalently, 0.001 revolution per symbol epoch for the slowest transmission data rate of typically 500 kilosymbols per second for the Z mode, a simple first order loop with a gain k in the range of $1/16$ is adequate to track the phase. The demodulator and decoder may optionally use a lower loop gain when processing bursts from modes Y and X which have a higher symbol rate.

For heavy coded bursts, four consecutive symbols are related which represent a code word in an (8,4) biorthogonal code which is well known. In this case, the decision direction is based on decoded results from the inner decoder 24 which receives the N BIT SOFT DECISIONS output from the phase tracking function 20 containing eight possible bits and outputs the four most likely bits in a manner which is well known. The output of the inner decoder 24 is in the form of a four-bit nibble which is applied to a nibble to byte converter 26 which converts consecutive nibbles from a single channel outputted from the inner decoder 24 into bytes for subsequent processing by outer decoder 28 which may be a Reed-Solomon decoder of well-known construction. The N BIT HARD DECISIONS output from the phase tracking function 20, which is in dibit groups, is applied to a dibit to byte converter 30, which outputs bytes from a single channel for subsequent decoding by the outer decoder 28. The output of the dibit to byte converter 30 is applied to an alignment delay 32 which provides time compensation for the processing delay produced by the inner decoder 24 so that the respective bytes outputted from the soft and hard processing paths become time aligned. The outputs from the nibble to byte converter 26 and the alignment delay 32 are applied to a multiplexer 34 which selects bytes from the soft or the hard decision path for inputting to a descrambler 36 of conventional construction which uses a scrambling code to prevent crosstalk between adjacent beams. The outer decoder 28 typically decodes GF (256) of size (236, 212).

The overall operation of the demodulator and decoder 10 is under the control of the onboard satellite processor (not illustrated) and receives timing signals from the satellite's uplink timing system which are not described in detail herein in view of their being well known.

The channelizer 10 has its simplest operation in the mode X. In this circumstance, all requisite filtering is performed by the X channelizer which provides the input to the decoder and demodulator 10. In the Y and Z processing modes, the Y and Z channelizer 12 is further required to divide the sub-band output from the X channelizer into further smaller channels for processing as described above.

The processing architecture of each of the output channels from the mode select multiplexer 18 requires substantial hardware for all twenty five Z channels, and is an inefficient decoding architecture for time mulitplexed X channel data streams. This architecture has less efficiency, high complexity, requires more circuitry and consumes substantial DC power which provides reduced processing flexibility for data reception, especially in environments such as satellites. This architecture further requires substantial memory for processing all of the output channels from the mode select multiplexer 18.

SUMMARY OF THE INVENTION

The present invention is a receiver and method of receiving data transmissions having a preferred application for reception of data by satellites. The invention buffers and sequences data from multiple channels at selected processing locations in a demodulator and decoder downstream of the output of the phase tracking function which reduces the number of nibble to byte converters, dibit to byte converters and block decoders compared to the prior art. As a result, increased data processing efficiency, better redundancy of processing, reduced consumption of DC power and miniaturization of circuitry is achieved while also providing greater processing flexibility.

A multichannel data demultiplexing and reordering memory processes the output data from multiple channels outputted from the phase tracking function. Time division multiplexed (TDM) processing of multiple channels eliminates parallel processing paths for each of the channels as in the prior art which required a soft and a hard decision processing path for each of the channels.

The invention further is a converter which combines inputs of one or more bits from multiple TDM channels outputted from the phase tracking function into multibit outputs for processing by a single outer decoder. As a result, the parallel processing of the prior art having individual inner decoders for each channel is eliminated. The converter is used in both the TDM multiple channel soft and hard decision processing paths which are outputted from the phase tracking function.

The invention further is a block memory which converts groups of bits from multiple TDM channels into blocks of bits each containing at least one group of bits for sequential decoding by an outer decoder. The block memory eliminates the requirement of an outer decoder in each channel as in the prior art. Outer decoders have sufficient processing speed to sequentially demodulate each of the blocks stored in the block memory which are readout and decoded within the time in the prior art that a single block is decoded.

A receiver in accordance with the invention includes a memory including an addressable storage array which stores a sequence of data samples contained in a time division multiplexed signal from a plurality channels and outputs the stored data samples in a sequence of data groups with each data group containing a plurality of samples from one of the plurality of channels; and a decoder, responsive to the data groups, which decodes the data samples within the data groups and outputs decoded data samples. The data samples may each comprise orthogonally encoded data; and the decoder may be a biorthogonal inner code soft decision data decoder. The inner decoder may be a Reed-Muller decoder. The orthogonally encoded data samples may be QPSK encoded. The receiver has a preferred application in a satellite. The invention further includes a channelizer, which is responsive to an input bandwidth and which divides the input bandwidth into a plurality of output channels each of equal bandwidth, one of the output channels comprising the time division multiplexed signal. The memory comprises a write address generator and a read address generator and the addressable storage array contains memory cells which are addressed by addresses generated by a write address generator and a read address generator, the sequence of data samples being written in a group of memory cells with addresses generated by the write address generator, and the sequence of data groups are each individually read out from a group of memory cells with addresses generated by the read address generator.

A method of data reception in accordance with the invention includes receiving and storing a time division multiplexed signal containing a sequence of data samples from a plurality of channels; outputting the stored data samples in a sequence of data groups, each data group containing a plurality of samples from one of the plurality of channels; decoding the data samples within each data group; and outputting the decoded data samples of the plurality of data groups. The data samples may each comprise orthogonally encoded data; and the decoder may be an inner code soft decision biorthogonal decoder. The orthogonally encoded data samples may be QPSK encoded. The data in a preferred application is received by a satellite. An input bandwidth is received and is divided with a channelizer into a plurality of output channels each of equal bandwidth, one of the output channels comprising the time division multiplexed access signal. The data samples are stored in a memory comprising a write address generator and a record address generator and an addressable storage array containing memory cells which are addressed by addresses generated by the write address generator and the read address generator, the sequence of data samples being written in a group of memory cells by addresses generated by the write address generator and the sequence of data groups are each individually read out from a group of memory cells by addresses generated by the read address generator.

BRIEF DESCRIPTION OF THE DRAWINGS

FIG. 3 illustrates the operation of a multichannel data demultiplexing and reordering memory in accordance with the present invention.

FIG. 4 illustrates the operation of a multichannel data converter which converts one or more bits into output words of an increased number of bits in hard and soft decision paths in accordance with the present invention.

FIG. 5 illustrates the operation of a block buffer memory in accordance with the present invention which converts data outputs from multiple demodulators and decoders into a data structure for sequential demodulation by a single outer decoder.

Like reference numerals identify like parts throughout the drawings.

DESCRIPTION OF THE PREFERRED EMBODIMENTS

Figure 2:
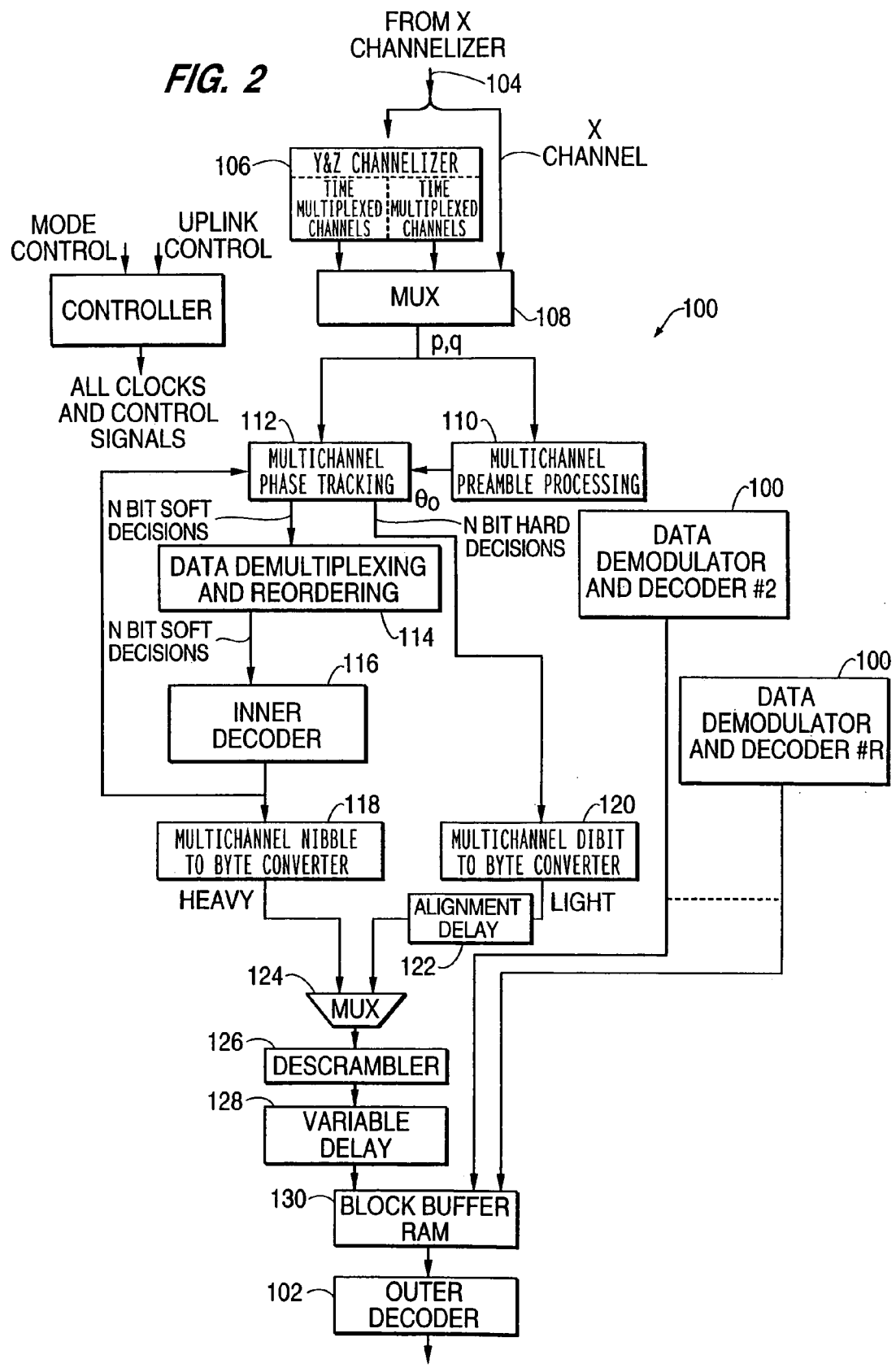
FIG. 2 illustrates a block diagram of a demodulator and decoder in accordance with the present invention having a preferred application in a satellite.

FIG. 2 illustrates a block diagram of a data demodulator and decoder 100 in accordance with the present invention. The data decoder and demodulator 100 differs from the prior art by processing multiple channel outputs from a phase tracking function in each data demodulator and decoder 100. As illustrated, a plurality of channels, which are R in number, are decoded by a single outer decoder 102 as described below to sequentially process the parallel inputs from the R data demodulators and decoders 100 within a time interval used to process an output of a single data demodulator and decoder 10 in the prior art. An input 104 from an X channelizer is applied to a Y and Z channelizer 106 of well-known construction which respectively processes the TDM Y and Z channels in accordance with the prior art discussed above. The input 104 from the X channelizer along with the Y and Z TDM output channels produced by the Y and Z channelizer 106 are applied to a multiplexer 108 which outputs either the X channel, the Y time multiplexed channels or the Z time multiplexed channels to multichannel preamble processing 110 and multichannel phase tracking 112. The preamble processing and phase tracking functions 110 and 112 may be in accordance with the prior art principles of control to produce proper phase lock loop tracking. The phase tracking function 112 has a N BIT SOFT DECISIONS output and a N BIT HARD DECISIONS output. The processing of the N BIT SOFT DECISIONS and the N BIT HARD DECISIONS is in accordance with the prior art except that multiple channels are processed with a multiple channel data demultiplexing and reordering memory 114, a multiple channel nibble to byte converter 118, a multiple channel dibit to byte converter 120, and block buffer 130 as described below.

The output from the phase tracking 112 of the N BIT SOFT DECISIONS is applied to a data multiplexing and recording memory 114, which may be a RAM or other type of memory, that functions to convert time multiplexed outputs from multiple channels into outputted sequences of bit groups from the individual channels as described below in conjunction with FIG. 3. The data multiplexing and reordering memory 114 includes an addressable storage array which stores a sequence of data samples contained in a TDM signal which is outputted from the multichannel phase tracking function 112 from a plurality of channels contained in the output 104 from the X channelizer. A write address generator and a read address generator are contained in the data demultiplexing and reordering memory 114 to respectively control generation of addresses which control writing of the TDM samples from multiple channels into the memory and the reading out of a sequence of data groups from the memory with each data group containing a plurality of samples from one of the plurality of channels as discussed below in conjunction with FIG. 3.

FIG. 3 illustrates the operation of the multiple channel data demultiplexing and reordering memory 114 which may be a RAM. The data is in accordance with a key of Ym(n) wherein m is the channel number and n is the time index. Therefore, it is seen, for example, that the sample Y1 (1) is a data sample from channel number one at time index one. As illustrated, the "INCOMING DATA" 202 is TDM samples 204 from channels Y1, Y2, Y3, Y4 and Y5. Each sample 204 is representative of two-bit symbols which are encoded by QPSK encoding and each are stored in a pair of memory cells. The data structure after storing the sequence of individual lines 202 of "INCOMING DATA" is in the block 206 located to the right of the legend "WRITE INTO RAM". The block 206 is comprised of four rows 208 of data samples which are identical to the incoming data 202 and are sequentially read in columns from successive stored lines 202 of the block 206 of the stored TDM input data.

Each of the memory cells is in an addressable storage array addressed by the aforementioned write and read addresses generated by write and read address generators contained in the memory in accordance with well-known memory addressing techniques. Each sequence of data samples in a line 202 of incoming data are written in a group of memory cells with write addresses spanning a full row 208. The bracket labelled "SAME CHANNEL" in the line labelled "DATA OUT OF RAM" identifies the continuous data samples of a single channel which are read out as a group 210. Finally, under the heading "PARALLELIZED" the read out of sequential data groups 210 is illustrated which are individually outputted from a group of memory cells of the memory addressed by read addresses the memory cells. It should be understood that the function of the data demultiplexing and reordering memory 114 is not limited to the processing of any number of bits.

Figure 1:
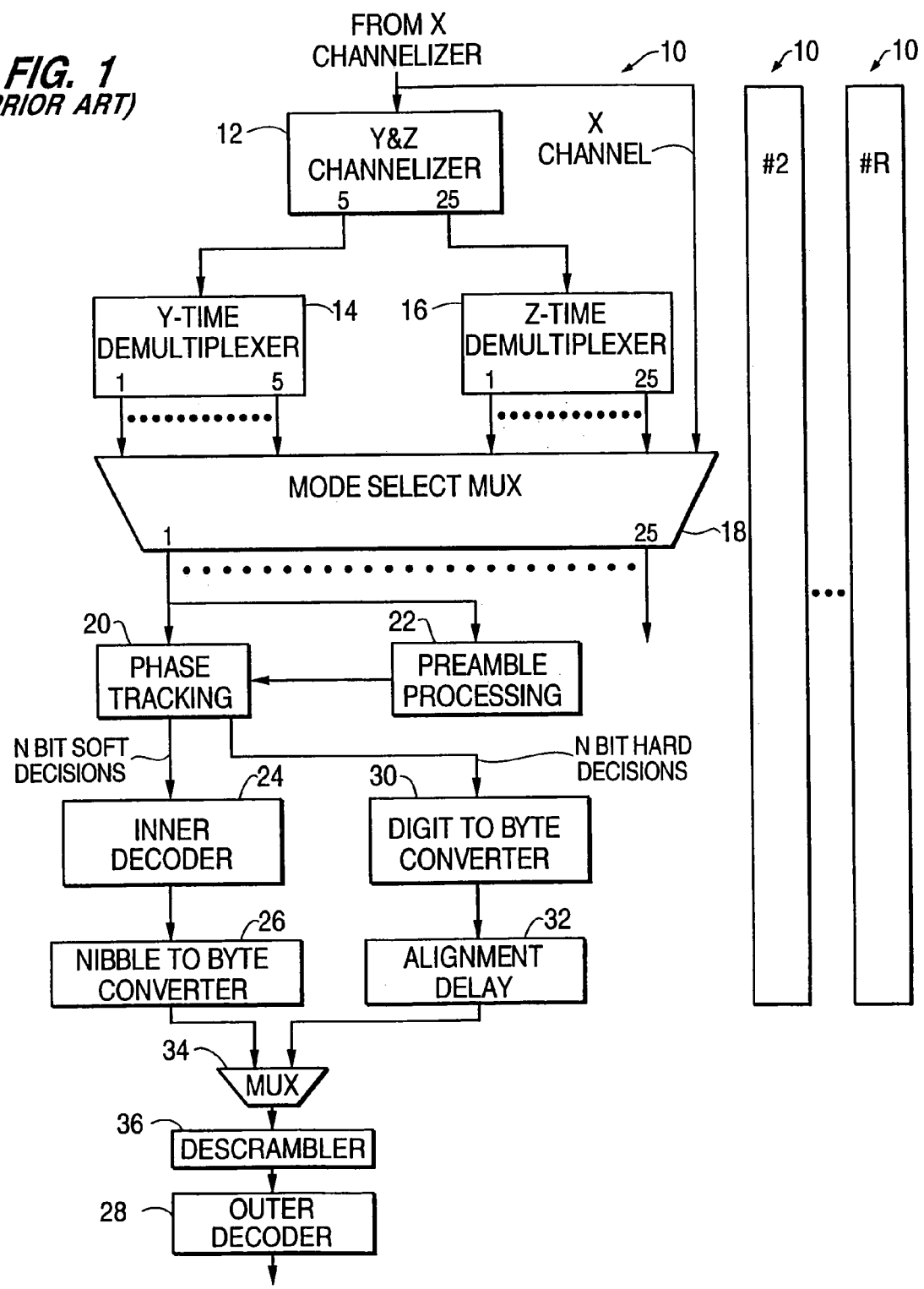
FIG. 1 illustrates a block diagram representative of a prior art demodulator and decoder of a type used in a satellite.

The data groups 210 are inputted to a conventional inner decoder 116 which may be a biorthogonal decoder which performs the same function as the prior art inner decoder of FIG. 1 in outputting the most likely four bits within the eight bit input. The output of the inner decoder 116 is fed back to the multichannel phase tracking 116 to provide a more accurate phase error estimate ∊ in the phase lock loop. In view of multiple channels of TDM data 202 being reordered into sequential groups of data 210 from individual channels by the data demultiplexing and reordering function 114, only a single inner decoder 116 is required to decode the inner code (e.g. 8,4 biorthogonal block code) from multiple channels instead of decoding only a single channel as in the prior art of FIG. 1.

A pair of multiple channel data converters 118 and 120 of similar construction respectively process the multiple bit outputs from the inner decoder 116 and from the data demultiplexing and reordering memory 114 to output words having a word length from one channel which the outer decoder 102 is designed to decode. The difference in the processing between the multiple channel nibble to byte converter 118 and the dibit to byte converter 120 is that the number of TDM input bits to the nibble to byte converter is four and the number of TDM input bits to the dibit byte converter is two with both converters producing a byte output. It should be understood that the processing performed by the converters 118 and 120 is not limited by any number of bits. The converters 118 and 120 convert data of multiple channels into larger data groups which are sized to facilitate efficient decoding by the outer decoder 102 which decodes data from a single channel during each decoding cycle. As a result, the number of converters required to process data with the present invention is reduced by a factor of the number of TDM channels in the data stream outputted by the phase tracking function 112.

Operation of the dibit to byte converter 120 is illustrated in FIG. 4 and is analogous to the operation of the data demultiplexing and reordering memory 114 illustrated in FIG. 3 described above in that two bit TDM samples are processed into a byte from one channel. The converter 120 also contains write and read address generators which address the writing and reading of data in the same manner as the data demultiplexing and reordering 114. The operation of the converter 120 is not repeated herein in view of its similarity to the operation of the demultiplexing and reordering memory 114 discussed above.

Furthermore, while not illustrated, operation of the nibble to byte converter 118 is analogous to the dibit to byte converter 120 except that only two TDM nibbles from multiple channels are inputted and one byte per channel is outputted to the block decoder 102. It should be understood that the processing performed by the converters 118 and 120 is not limited by any number of bits.

The converters 118 and 120 permit the conversion of TDM data from multiple channels into data groups which are sized for the decoding performed by the outer decoder 102. As a result, the number of converters required to process data with the present invention is reduced by a factor of the number of TDM channels which are in the data stream outputted by the phase tracking function 112.

The output of the dibit to byte converter 120 is applied to an alignment delay 122 which time aligns the N BIT SOFT and N BIT HARD DECISIONS inputted to a multiplexer 124 which selects one of the outputs from the nibble to byte converter 118 or dibit to byte converter 120 depending upon whether operation is in the heavy or light mode as described in the prior art above. The output of the multiplexer 124 is applied to a descrambler 126 which is in accordance with the prior art. The output of the descrambler 126 is applied to a variable delay 128 which provides time alignment between the outputs of the R data demodulator and decoders 100 which are inputted to a block buffer memory 130 which is coupled to a plurality of data channels respectively outputted from each of the data demodulators and decoders 100.

The block buffer memory 130 stores the inputted data groups from the converters 118 and 120 and outputs data blocks. The block buffer memory 130 also contains write and read address generators which control the writing and reading of data. Each data block contains at least one data group (e.g., 8 bits) and sequentially outputs the data blocks from each of the data demodulators and decoders 100 to the outer decoder 102 for sequential decoding as described below.

The processing of N BIT HARD DECISIONS requires only one data conversion of N BIT HARD DECISIONS from multiple channels which is performed by converter 120 while the processing performed by the N BIT SOFT DECISIONS from multiple channels requires sequential data conversions. The sequential data conversions are performed by the data demultiplexing and reordering memory 114 which packs two-bit symbols into bytes, which are decoded by the inner decoder 116 into an output nibble of the most likely bits from multiple TDM channels, which require further conversion by the nibble to byte converter 118 to output data words from multiple TDM channels of the correct length for decoding by the outer decoder 102.

The operation of the block buffer memory 130 is illustrated in FIG. 5 which represents processing of data encoded with the ATM protocol. As illustrated, the outputs from the R input channels produced by the individual data demodulator and decoders 100 are comprised of two hundred thirty-six bytes which are made up of four ATM cells each of fifty-three bytes and twenty-five parity bytes. The individual channel outputs containing four ATM cells including parity bits are written from all of the R channels in sequence into the block buffer memory 130. As illustrated, the inputs are written into storage in parallel and are outputted in serial blocks 1-R of two hundred thirty six bytes to the outer decoder.

The block buffer memory 130 functions to read out data at R times the individual X channel data input rate and functions in accordance with the relationship $$AR = \left(\frac{SR}{Z}\right) * R$$

wherein AR is the readout rate of the memory, SR is a symbol rate of data samples in the data groups, Z is a ratio of a length in bits of a block to a number of bits per symbol and R is the number of parallel channels. This permits the outer decoder 102 to be designed to process the individual ATM frames each containing encoded multiple TDM channels of data of two hundred thirty six bytes sequentially so that the outer decoding function may be performed by the single outer decoder 102 for each of the R channels. This eliminates the need for multiple outer decoders 28 in the prior art of FIG. 1.

Substantially less hardware is required for the present invention as illustrated in FIG. 2 in comparison to the prior art of FIG. 1. This reduction in hardware is achieved by the combination of processing produced by the data demultiplexing and reordering memory 114, nibble to byte converter 118, dibit to byte converter 120 and block buffer memory 130. The data demultiplexing and reordering memory 114, nibble to byte converter 118 and dibit to byte converter 120 facilitate the necessary processing of multiple channels of TDM data to provide efficient multiple channel processing using common hardware instead of the single channel processing of the prior art which required a replication of processing hardware for each of the multiple channels. The high data access speed of the block buffer memory 130, is used to provide data at a high readout rate to the outer decoder 102 for decoding at a high data rate which may be greater than 28 megabytes per second when the individual input data rate to the block buffer 130 from the output of the individual data demodulators and decoders 100 is 4.67 megabytes per second for all of the X, Y and Z operational modes. A Reed-Solomon decoder, functioning as the outer decoder 102, has a pipeline processor architecture permitting the aforementioned sustained high throughput from multiple TDM channels.

While the invention has been described in terms of the preferred embodiment, it should be understood that numerous modifications may be made to the invention without departing from the spirit and scope of the invention. It is intended that all such modifications fall within the scope of the appended claims.

What is claimed is:

1. A satellite data reception system comprising:

a channelizer which receives a frequency spectrum containing samples of a band transmitted from a transmitter over a wireless link and divides the frequency spectrum into subbands including a sequence of the data samples comprising a time division multiplexed signal from multiple channels output by the channelizer with each successive data sample belonging to a channel different from a channel to which an immediately preceding data sample belongs;

a multiple channel phase tracking coupled to the time division multiplexed signal from the multiple channels which outputs sequentially groups of most likely bits and from hard decisions from multiple channels;

a first memory, coupled to groups of most likely bits, which stores the groups of most likely bits from the multiple channels and outputs a sequence of data groups equal to a number of the multiple channels with each data group containing a plurality of samples from one of the multiple channels;

an inner decoder, responsive to the sequence of data groups from the first memory, which outputs decoded data groups from the multiple channels;

a second memory, coupled to the decoded data groups from the multiple channels and to the hard decisions from multiple channels, which stores the decoded data groups and the hard decisions into data blocks which are sequentially output by the second memory; and an outer decoder which decodes the sequentially output data blocks from the second memory.

2. A method of receiving data in a satellite which is transmitted from a transmitter over a wireless link that is received with a data receiving system including a channelizer, a multiple channel phase tracker, a first memory, an inner decoder, a second memory and an outer decoder comprising:

receiving with the channelizer a frequency spectrum containing data samples transmitted from the transmitter and dividing the frequency spectrum into subbands, including a sequence of data samples comprising a time division multiplexed signal output from multiple channels with each successive data sample belonging to a channel different from a channel to which an immediate preceding data sample belongs;

the multiple channel phase tracking in response to the time division multiplexed signal from the multiple channels sequentially outputs groups of most likely bits and hard decisions from the multiple channels;

storing with the first memory groups of most likely bits from the multiple channels and outputting a sequence of data groups equal to a number of the multiple channels with each data group containing a plurality of samples from one of the multiple channels;

the inner decoder, in response to the output of data groups from the first memory, outputs decoded data groups from the multiple channels;

the second memory in response to the decoded data groups and to the hard decisions, stores and sequentially outputs the decoded data groups and the hard decisions into data blocks; and the outer decoder, in response to the sequential output of the stored data blocks from the second memory, sequentially decodes the data blocks.

3. A receiver comprising:

an input in the receiver which receives a time division multiplexed signal containing a plurality of channels which has been transmitted from a transmitter;

a memory coupled to the input, including an addressable storage array which stores a sequence of data samples contained in the time division multiplexed signal from the plurality of channels with each successive data sample belonging to a channel different than a channel to which an immediately preceding data sample belongs and outputs the stored data samples in a sequence of data groups equal in number to a number of the plurality of channels with each data group containing a plurality of samples from one of the plurality of channels;

a decoder, responsive to the sequence of data groups, which decodes the data samples within the sequence of data groups and outputs decoded data samples of the plurality of data groups from the plurality of channels;

a multichannel phase tracking which processes the data groups from the plurality of channels to output from each data group a group of most likely bits; and wherein the data samples each comprise orthogonally encoded data;

the decoder is a biorthogonal inner code soft decision data decoder which decodes groups of most likely bits.

4. A receiver in accordance with claim 3 further comprising:

a channelizer coupled to the input and to the memory, which is responsive to an input bandwidth and which divides the input bandwidth into a plurality of output channels each of equal bandwidth, one of the output channels comprising the time division multiplexed signal.

5. A receiver in accordance with claim 3 wherein:

the memory further comprises a write address generator and a read address generator and the addressable storage array contains memory cells which are addressed by addresses generated by the write address generator and the read address generator, the sequence of data samples being written in a group of the memory cells with addresses generated by the write address generator and the sequence of data groups being read out with addresses generated by the read address generator.

6. A receiver in accordance with claim 3 wherein:

the receiver is contained in a satellite.

7. A receiver in accordance with claim 6 further comprising:

a channelizer coupled to the input and to the memory, which is responsive to an input bandwidth and which divides the input bandwidth into a plurality of output channels each of equal bandwidth, one of the output channels comprising the time division multiplexed signal.

8. A receiver in accordance with claim 6, wherein:

the memory comprises a write address generator and a read address generator and the addressable storage array contains memory cells which are addressed by addresses generated by the write address generator and the read address generator, the sequence of data samples being written in a group of memory cells with addresses generated by the write address generator, and the sequence of data groups being read out with addresses generated by the read address generator.

9. A receiver in accordance with claim 3 comprising:

an outer decoder, coupled to the inner decoder, which sequentially decodes blocks of data including the most likely bits from the plurality of channels.

10. A receiver in accordance with claim 9 wherein:

the multichannel phase tracking outputs hard decisions from the multiple channels which are coupled to the outer decoder and the blocks of data include the hard decisions which are also decoded by the outer decoder.

11. A receiver in accordance with claim 9 wherein:

the memory comprises a write address generator and a read address generator and the addressable storage array contains memory cells which are addressed by addresses generated by the write address generator and the read address generator, the sequence of data samples being written in a group of memory cells with addresses generated by the write address generator, and the sequence of data groups being read out with addresses generated by the read address generator.

12. A receiver in accordance with claim 9 wherein the biorthogonal inner code soft decision data decoder is a Reed-Muller decoder.

13. A receiver in accordance with claim 11 wherein the orthogonally encoded data samples are QPSK encoded.

14. A receiver in accordance with claim 11 herein the receiver is contained in a satellite.

15. A receiver in accordance with claim 14 further comprising;

a channelizer coupled to the input and the memory, which is response to an input bandwidth and which divides the input bandwidth into a plurality of output channels each of equal bandwidth, one of the output channels comprising the time division multiplexed signal.

16. A receiver in accordance with claim 9 wherein the receiver is contained in a satellite.

17. A receiver in accordance with claim 16 further comprising:

a channelizer coupled to the input and to the memory, which is responsive to an input bandwidth and which divides the input bandwidth into a plurality of output channels each of equal bandwidth, one of the output channels comprising the time division multiplexed signal.

18. A method of data reception comprising:

at an input of a receiver receiving a time division multiplexed signal containing a plurality of channels which has been transmitted from a transmitter;

storing with a memory a sequence of data samples contained in the time division multiplexed signal from a plurality of channels with each successive data sample belonging to a channel different than a channel to which an immediately preceding data sample belongs;

outputting from the memory the stored data samples in a sequence of data groups equal in number to a number of the plurality of channels with each data group containing a plurality of samples from one of the plurality of channels;

using a decoder which is responsive to the sequence of data groups to decode the data sample within the sequence of data groups;

outputting from the decoder the decoded data samples of the plurality of data groups from the plurality of channels; and performing multiphase tracking of the data groups from the plurality of channels to output from each group a group of most likely bits;

wherein the data samples each comprise orthogonally encoded data; and wherein the decoder is an inner code soft decision biorthogonal decoder which decodes groups of most likely bits.

19. A method in accordance with claim 18 wherein:

the receiver is contained in a satellite.

20. A method in accordance with claim 19 wherein:

an input bandwidth from the transmitter is received by the receiver and is divided by the receiver with a channelizer into a plurality of output channels each of equal bandwidth, one of the output channels comprising the time division multiplexed signal.

21. A method in accordance with claim 19 further comprising:

addressing memory cells of memory by addresses generated by a read address generator and a write address generator, the sequence of data samples being written in a data group of memory cells by addresses generated by the write address generator and the sequence of data groups individually outputted from a group of memory cells being generated by addresses generated by the read address generator.

22. A method in accordance with claim 18 comprising:

sequentially decoding blocks of data including the most likely bits from the plurality of channels.

23. A method in accordance with claim 22 wherein:

the multichannel phase tracking outputs hard decisions from multiple channels which are coupled to the outer decoder and the blocks of data include the hard decisions which are also decoded by the outer decoder.

24. A method in accordance with claim 22 wherein the orthogonally encoded data samples are QPSK encoded.

25. A method in accordance with claim 22 wherein the receiver is contained in a satellite.

26. A method in accordance with claim 25 wherein:

an input bandwidth from the transmitter is received by the receiver and is divided by the receiver with a channelizer into a plurality of output channels each of equal bandwidth, one of the output channels comprising the time division multiplexed signal.

27. A method in accordance with claim 25 further comprising:

addressing memory cells of the memory by addresses generated by a read address generator and a write address generator, the sequence of data samples being written in a data group of memory cells by addresses generated by the write address generator and the sequence of data groups individually outputted from a group of memory cells being generated by addresses generated by the read address generator.

28. A method in accordance with claim 22 wherein:

the data samples are stored in an addressable storage array containing memory cells which are addressed by a pair of addresses, the sequence of data samples being written in a group of memory cells each containing one common address of the pair of addresses and the sequence of data groups are each individually outputted from a group of memory cells containing one common address which is another of the pair of addresses.

\* \* \* \* \*